United States Patent
Jones (10) Patent No.: US 9,159,256 B2
(45) Date of Patent: Oct. 13, 2015

(54) APPARATUS FOR MARKETING A BRAND

(71) Applicant: Girard Jones, Whittier, CA (US)

(72) Inventor: Girard Jones, Whittier, CA (US)

(*) Notice: Subject to any disclaimer, the term of this patent is extended or adjusted under 35 U.S.C. 154(b) by 42 days.

(21) Appl. No.: 14/052,728

(22) Filed: Oct. 12, 2013

(65) Prior Publication Data

US 2015/0101225 A1 Apr. 16, 2015

(51) Int. Cl.
- G09F 21/04 (2006.01)
- G09F 23/00 (2006.01)
- G09F 19/00 (2006.01)
- B60R 7/04 (2006.01)

(52) U.S. Cl.
CPC . G09F 23/00 (2013.01); B60R 7/04 (2013.01); G09F 19/00 (2013.01)

(58) Field of Classification Search
USPC .............. 40/322, 331, 316, 593, 599, 643; 24/127
See application file for complete search history.

(56) References Cited

U.S. PATENT DOCUMENTS

| | | | |
|---|---|---|---|
| 5,398,984 A | 3/1995 | Elder | |
| 5,676,284 A | 10/1997 | Schenberg | |
| 6,990,761 B1* | 1/2006 | Cox | 40/316 |
| 7,267,252 B2 | 9/2007 | Goodman | |
| 7,481,340 B2 | 1/2009 | Murphy | |
| RE42,568 E | 7/2011 | Artemi | |
| 8,516,727 B1* | 8/2013 | Maraia | 40/316 |
| 2010/0325842 A1* | 12/2010 | Rivera | 24/3.4 |
| 2011/0049200 A1 | 3/2011 | Rodberg | |
| 2011/0113660 A1* | 5/2011 | Aiezza | 40/322 |
| 2013/0015215 A1 | 1/2013 | Coote | |

* cited by examiner

*Primary Examiner* — Joanne Silbermann
(74) *Attorney, Agent, or Firm* — Jafari Law Group, Inc.; David V. Jafari; Saul Acherman (57) ABSTRACT

An apparatus for marketing a brand may generally comprise coupling members and an advertising member. The advertising member may serve as a marketing tool upon which a marketer can display information to a potential consumer, thereby making a commercial impression upon an end user. Each coupling member is configured to be placed upon a hook, or to receive a hook from a hanger. For example, a coupling member may be configured to receive a plurality of hooks. Said coupling members may also be equipped with adjustors, such as to allow for the apparatus to be secured to a hook, and for the plurality of hangers to be secured to the apparatus.

1 Claim, 10 Drawing Sheets

APPARATUS FOR MARKETING A BRAND

TECHNICAL FIELD OF THE INVENTION

The present invention relates in general to an apparatus for marketing a brand, and more specifically, to an apparatus or hanging device used to secure and transport a plurality of hangers, which serves as a promotional tool for marketing a brand.

BACKGROUND OF THE INVENTION

Promotional items are a known marketing tool utilized throughout various industries. Promotional items are either sold or given away to customers or clients with the purpose of promoting a particular brand of products or services. For example, items such as pens, pencils, and notepads, are often used in the hospitality industry to promote hotel brands. Often, promotional items can be decorative items, but typically, promotional items are functional so as to increase the promotional value of the item. However, the commonality of these items (i.e. the fact that virtually every hotel offers pens or notepads displaying the hotel brand), and the fact that a user often fails to take these items with them, is an undesirable result of many promotional items known in the prior art. Users of these common promotional items become so accustomed to receiving them that the items lose promotional value. Thus, there is always a need for new and unique promotional items that offer unique opportunities to market, advertise, or promote a particular brand.

Hangers in general are useful tools for hanging garments. They help to organize garments as well as to keep their shape, for example, to prevent wrinkles from forming. Many people utilize a wide array of hangers for these very purposes. In the hospitality industry, for example the hotel-casino industry or the cruise-ship industry, hangers are typically provided in guestrooms. Additionally, hangers are widely used in high-end or luxury hotels that provide special services to their guest such as laundry and dry cleaning services.

Whether an individual privately sends their garments to a dry cleaning service, or a hospitality service provider offers a dry cleaning service to their guests, it is often necessary to transport multiple hangers and articles of clothing from one location to another. For example, when a person picks up their newly cleaned garments from a dry cleaner, it is typically necessary to take multiple cleaned garments placed upon multiple separate hangers, and transport the lot back to another location. Similarly, luxury hotels that offer premium services, such as dry cleaning services, must provide their guests with multiple hangers every time a guest requires cleaning of multiple articles of clothing. Often, the guest will desire to take their dry cleaned articles of clothing either from the reception's desk to their guestroom, or from their guestroom to their vehicle, for example, when leaving the hotel after a vacation or business trip. Thus, it is desirable to offer these service providers with a useful promotional item that addresses this issue, and allows for the promotion and marketing of their brand.

For example, when transporting newly dry-cleaned clothes in a vehicle, having multiple articles of clothing is particularly problematic. Placing multiple hangers on a hook provided in a typical car is burdensome, and often impossible, as multiple hangers may not fit on the typically small hook. It is also often the case that there is only a single hook for hanging garments in the car. Whatever the case, when transporting multiple garments in a vehicle, some of the hangers may need to be transferred to another hook in the car, or placed on the back seat, or transferred to a trunk space; all of these options are undesirable, as the garments may become wrinkled, dirtied, or both. Furthermore, because the dry cleaner typically bundles all of the clothes together in a nice neat package, it is more desirable to keep all the garments held together rather than have to separate them in order to transport them to another location. Thus, while there are several other options to transporting multiple garments, neither is ideal.

Therefore, in light of the problems presented by the prior art, there is a need in the art for a hanging device that is capable of efficiently securing hangers for transportation, and serves as a promotional item by offering functionality to users and a marketing opportunity to distributors. It is to these ends that the present invention has been developed.

BRIEF SUMMARY OF THE INVENTION

To minimize the limitations in the prior art, and to minimize other limitations that will be apparent upon reading and understanding the present specification, the present invention describes an apparatus, or hanging device, used to secure and transport a plurality of hangers, which serves as a promotional tool for marketing a brand.

In one embodiment of the present invention, a device for marketing a brand, comprises: a first coupling member configured to attach to a vehicle hanging member; a second coupling member coupled to or integral with the first coupling member, wherein the second coupling member is configured to support thereupon one or more clothing hangers; and an advertising member coupled between the first and second coupling members, wherein the advertising member comprises indicia for promoting one or more goods or services.

In another embodiment of the present invention, a device used for promotional purposes, comprises: a first coupling member configured to attach to a vehicle hanging member; a second coupling member comprising at least a portion of a cord; and an advertising member coupled between the first and second coupling members, wherein the advertising member comprises indicia for promoting one or more goods or services.

In yet another embodiment of the present invention, a hanger accessory for promoting a brand, comprises a first coupling member configured to attach to a vehicle hanging member; a second coupling member coupled to or integral with the first coupling member, wherein the second coupling member is configured to support thereupon one or more clothing hangers; and an advertising member coupled to the first and second coupling members, wherein the advertising member comprises indicia for promoting one or more goods or services.

It is an objective of the present invention to provide a means of advertising or marketing a brand for businesses, nonprofits, individuals, and others, via a promotional item that is functional to users.

It is another objective of the present invention to provide businesses, nonprofits, individuals, and others with a brand marketing opportunity for distribution via dry-cleaning services.

It is yet another objective of the present invention to provide hospitality service providers, such as hotel-casinos or cruise-ship operators, with a brand marketing opportunity by means of providing their guests with a promotional item associated with their hospitality services.

It is yet another objective of the present invention to provide users with a means to easily and safely transport their articles of clothing from one location to another.

It is yet another objective of the present invention to provide hospitality service providers, such as hotel-casinos or cruise-ship operators, with a promotional item that can be distributed to their patrons in a manner that will guarantee the item's use and thus exploit a marketing opportunity.

It is yet another objective of the present invention to provide hospitality service providers, such as hotel-casinos or cruise-ship operators, with a hanger apparatus used to secure and transport a plurality of hangers, which serves as a promotional tool for marketing a brand.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows.

DETAILED DESCRIPTION OF THE INVENTION

In the following discussion that addresses a number of embodiments and applications of the present invention, reference is made to the accompanying figures that forms a part thereof, where depictions are made, by way of illustration, of specific embodiments in which the invention may be practiced. It is to be understood that other embodiments may be utilized and changes may be made without departing from the scope of the present invention.

Figure 1:
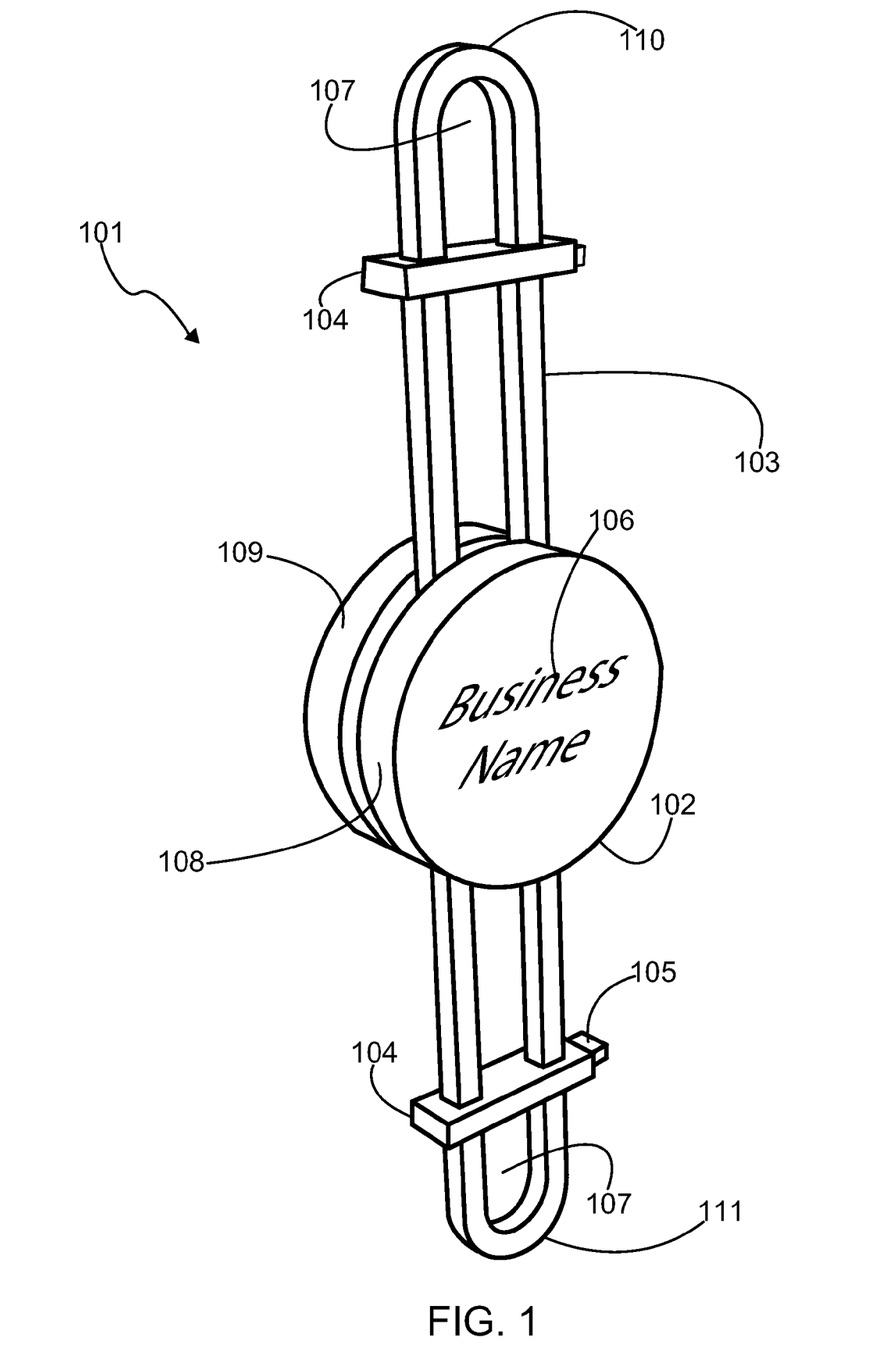
FIG. 1 is a three dimensional schematic view of an apparatus for marketing a brand, or hanging device, in accordance with one embodiment of the present invention.

FIGS. 1-7 depict one embodiment of the present invention. FIG. 1 is a three dimensional schematic view of a device for marketing the brand of a business. Very generally, it is a promotional item, but more specifically, a hanger apparatus used to secure and transport a plurality of hangers, which serves as a promotional tool for marketing a brand. FIG. 1 shows hanging device 101. Hanging device 101 comprises of marketing member 102, connector 103, and adjustors 104, each of which, include button 105 for the adjustors 104 to be adjusted when securing hanging device 101 to, for example, a car hook and plurality of hangers.

Advertising member 102 serves as a marketing component for offering an opportunity for a business to promote their brand by placing marketing indicia 106, which displays a business name, on hanging device 101. For example, and without departing from the scope of the present invention, marketing indicia 106 may contain a slogan, a brand name, a logo, a design, or a business name as shown in FIG. 1. The manner in which marketing indicia 106 may be displayed is not to be limited. Marketing indicia 106 may, for example, be engraved on both sides of advertising member 102. Other means that may be employed to convey a marketing message may include, without departing from the scope of the present invention, the use of stickers, acid etchings, paintings, prints, lithographs, hand drawings, pencil markings, pen markings, photographs, digital displays, either on one side, the front, the back, or all around advertising member 102, and or any other means or combination of means of conveying any particular marketing message.

In the embodiment shown in FIG. 1, advertising member 102 comprises two components, front component 108 and back component 109, which sandwich connector 103 in place. Components 108 and 109 may be made of any material that is durable and suitable for either displaying a brand, such as marketing indicia 106, or made to look like objects representative of a business or brand. For example, and without departing from the scope of the present invention, front component 108 and back component 109 may be made of a durable plastic, constructed to look like two casino chips that each identify a particular hotel-casino. Alternatively, advertising member 102 may comprise a single component, or a plurality of components, constructed of wood, clay, glass, metals, ceramics, plastics, or any combination of any natural or synthetic material, without deviating from the scope of the present invention. Additionally, it is understood that marketing indicia 106 may be placed on any part of advertising member 102 such as either front component 108, or back component 109, or both.

In another embodiment, other means may be employed to convey a marketing message, and for example, advertising member 102 may comprise of a single elongated cylinder with two openings on either flat surface, or a cavity, through which connector 103 may pass and be secured. This shape may be used to place a marketing indicia such as a label, all around a circumference of advertising member 102 (see, e.g. FIGS. 10, 11 and 14). Furthermore, other shapes such as cubical, spherical, or any other geometric or non-geometric shapes that help represent a brand may be employed without departing from the scope of the present invention.

In addition to shapes, as stated above, advertising member 102 may comprise objects representative of the brand being advertised or marketed. For example, and in no way limiting the scope of the present invention, advertising member 102 may comprise coasters to be marketed by a restaurant, buttons to be marketed by a clothing company, campaign buttons to be marketed by politicians, coins (or fake coins) to be marketed by banks, corks to be marketed by a vineyard, or other objects representative of the brand being marketed, or any other conceivable device suitable for the purpose of marketing a brand.

To expound upon the marketing feature of hanging device 101, a casino, for example, may desire to utilize hanging device 101 where advertising member 102 is comprised of two casino chips, each casino chip displaying the casino's name. The casino may then use hanging device 101 to either sell to its guests in the gift shop or even distribute to guests as a complimentary service during their stay at the casino, for example, as a promotional item distributed every time a guest uses or requests the hotel's dry cleaning or laundry service. Each time that a guest thereafter utilizes hanging device 101, the guest would naturally see the casino's poker chips, as they may form the central component of hanging device 101. The guest would thus be exposed and potentially reminded of his positive stay at the casino, thereby allowing for the casino to further penetrate its market and drive return business. Hanging device 101 is also functional for the end user, as will be described below, while providing for a marketing opportunity for an intermediary such as a casino. Hanging device 101, however, is not limited to distribution by casinos, as other businesses, nonprofits, individuals, or other entities may take advantage of its marketing capabilities.

Connector 103 can be a single component, or made up of multiple components. For example, and without limiting the scope of the present invention, connector 103 may be a single component of a general cord-like nature. As such, connector 103 may be generally flexible and easily manipulated so as to facilitate hanging the device, for example, from a car hook (See FIG. 13). A flexible or cord-like structure and material may be desirable to facilitate receiving a plurality of hangers such that the hangers are tightly secured and not prone to moving about hanging device 101. However, a rigid and sturdier material could be used for connector 103 without deviating from the scope of the present invention.

Connector 103 may be constructed of any wire (with a single strand or multiple strands), string, plastic, rope, twine, or any other like material. In one embodiment, connector 103 may comprise of a rigid material, such as a plastic, yet still accomplish a similar result. Although a hardened material may allow for some movement about connector 103, in one embodiment of the present invention, a generally curved connector 103 may significantly restrict this movement, thus allowing for a hanger to be securely hung about hanging device 101.

Connector 103 may comprise a variety of shapes without departing from the scope from the present invention. For example, connector 103 may have a substantially cubically shaped perimeter, as shown in FIG. 1, or a tubular or substantially cylindrically shaped perimeter, as shown in FIG. 10-14, or any other shape without deviating from the scope of the present invention. Typically, it is desirable to construct connector 103 of a generally tubular shape so as to provide a smooth flexible surface that is adaptable to a variety of hooks, and so the device itself is flexible and can be transported easily. For example, although connector 103 could be made out of a more rigid material, this may prevent a user from being able to place hanging device 101 in, for example, their pocket.

Whether a rigid or less flexible material is used to construct connector 103, or whether a flexible cord-like structure and material is used, or whether connector 103 comprises one or multiple components, connector 103 should be constructed so that connector 103 comprises a first coupling member and a second coupling member. Thus, connector 103 may be constructed as a single component, or multiple components, without deviating from the scope of the present invention.

In one embodiment, connector 103 comprises a single component with an upper portion and a lower portion or a first coupling member and a second coupling member. The single component may be for example, and without limiting the scope of the present invention, a cord constructed of durable synthetic material, which forms a single closed loop.

Figure 12:
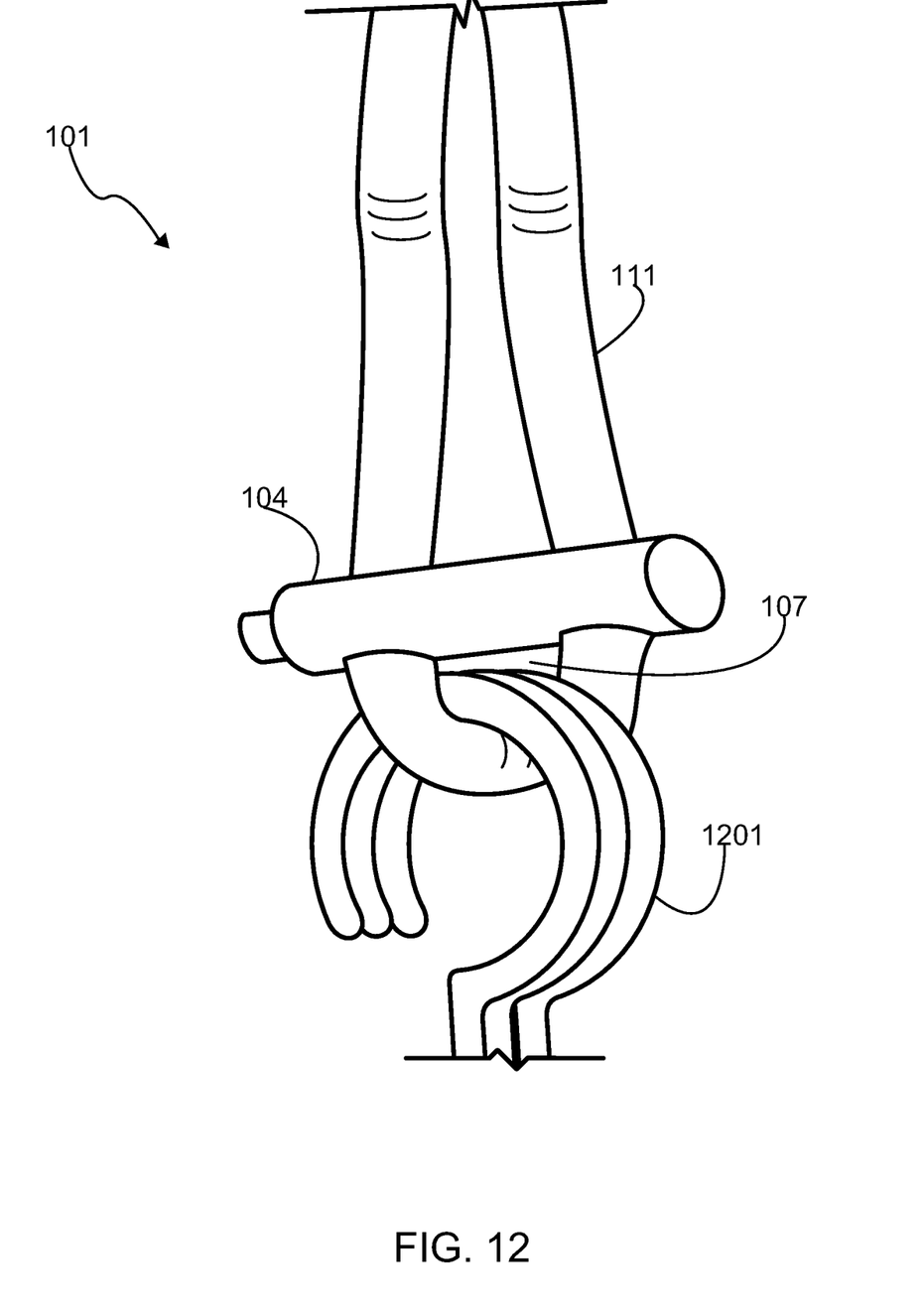
FIG. 12 is a three dimensional close-up schematic view of the second coupling member, in accordance with one embodiment of the present invention, wherein the second coupling member comprises a cord. An adjustor is coupled to the cord, which is shown retaining the hooks of several hangers placed in the small loop created by the adjustor.
Figure 13:
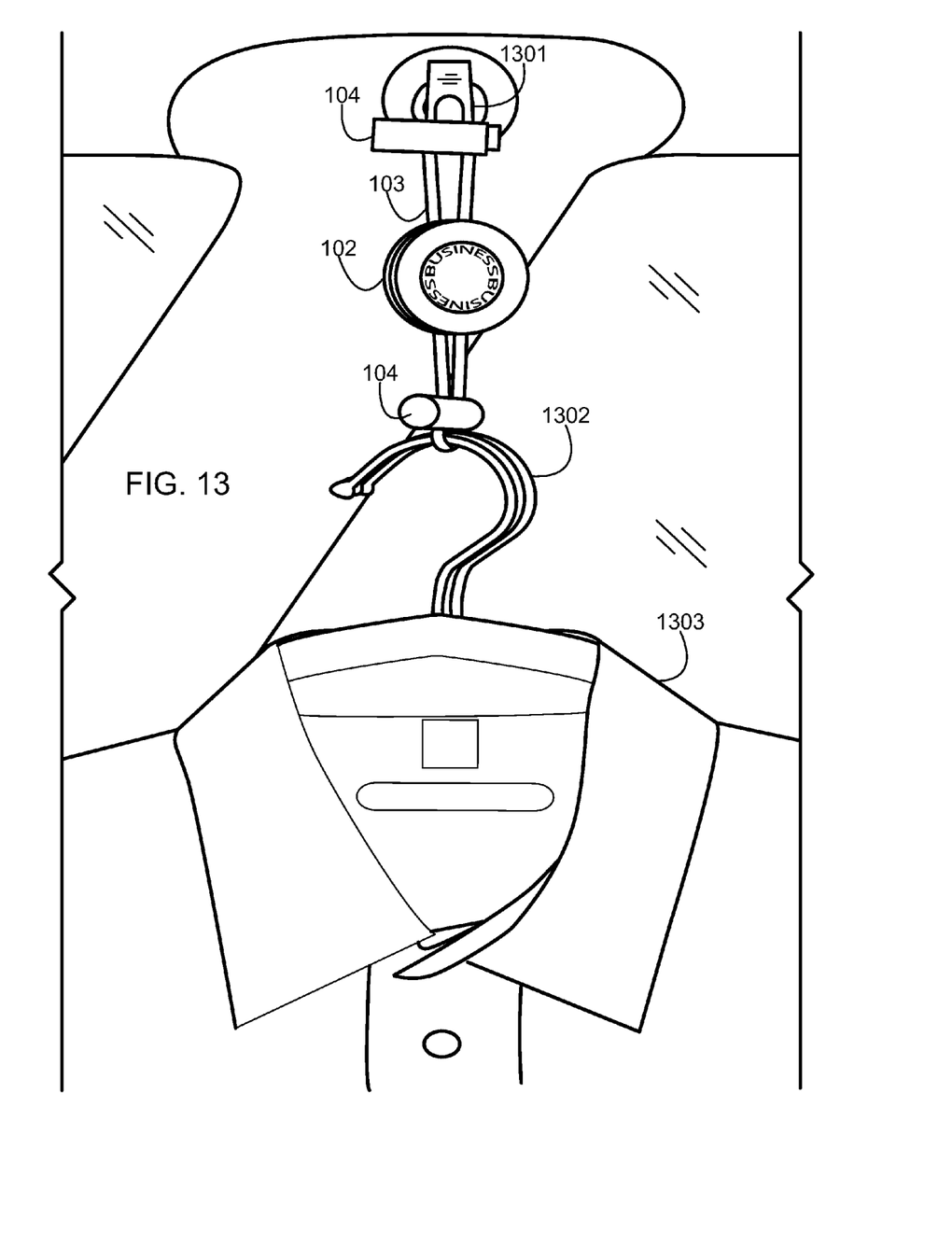
FIG. 13 is a close-up schematic view of the interior of a vehicle, wherein a typical vehicle hanging member, or car hook, is being used to hang several hangers securely held together with a hanging device, in accordance with one embodiment of the present invention.

Typically, and without limiting the scope of the present invention, connector 103 comprises an upper portion, or first coupling member 110, which is adapted to receive a hook, such as a car hook, and a lower portion or second coupling member 111, which is adapted to receive a plurality of hooks, such as a plurality of hangers (See FIG. 12 and FIG. 13).

To adjust or secure hanging device 101 to a hook such as a car hook, and to secure a plurality of hangers to hanging device 101, adjustors 104 may be implemented as shown in FIG. 1, in accordance with one embodiment of the present invention. Adjustors 104 can be typical adjustors common in the art. For example, and without limiting the scope of the present invention, in one embodiment, adjustors 104 are cord adjustors that comprise a spring loaded button, which can be depressed for releasing or securing the adjustor in place. In such embodiment, adjustors 104 are configured to receive a cord, and button 105 on each adjustor is used to adjust the space between the extremities of connector 103 on either first coupling member 110 or second coupling member 111. In other words, depressing button 105 may allow for an end user to manually adjust adjustors 104 up and down the vertical height of connector 103. Other similar adjustors known in the art may be employed by hanging device 101 to accomplish similar adjustability, without deviating from the scope of the present invention. To illustrate this feature of hanging device 101, see FIG. 13.

Adjustors 104 may be placed upon connector 103 at two locations as depicted in FIG. 1, i.e. on first coupling member 110 and on second coupling member 111 of connector 103. Adjustors 104 may be placed with button 105 facing one side of hanging device 101, as shown in FIG. 1, or they may be facing opposite sides, without departing from the scope of the present invention. In other words, adjustors 104 may contain button 105 either on the left side, or the right side, or on alternating sides. Adjustors 104 may allow for further restrictions on the mobility of hanging device 101. For example, the adjustor on first coupling member 110 of connector 103 may be positioned higher on connector 103, thus creating loops, such as loop 107 shown in FIG. 1. Similarly, adjustors 104 may be positioned closer to advertising member 102, thereby controlling the size of loop 107. For example, a larger initial loop 107 may be desirable for placing hanging device 101 on a hook in the interior of a car. After hanging device 101 is secured to said car hook, a user may thereafter adjust adjustors 104 in a manner so that an upper adjustor comes to rest near the top of first coupling member 110 of connector 103 and may even touch the hook of the interior of the car, thereby creating a tighter hold.

One of the adjustors 104, i.e. on the lower portion of hanging device 101, may be similarly adjusted to secure any hangers that may be received by hanging device 101. For example, after a plurality of hangers are placed through loop 107 on second coupling member 111 of connector 103, the adjustor may be lowered to tightly secure the plurality of hangers. See, e.g. FIG. 12 and FIG. 13. This adjustability feature of hanging device 101 is desirable such that hangers and the clothes upon said hangers may be secured from the sudden braking and acceleration that drivers are prone to make.

Figure 2:
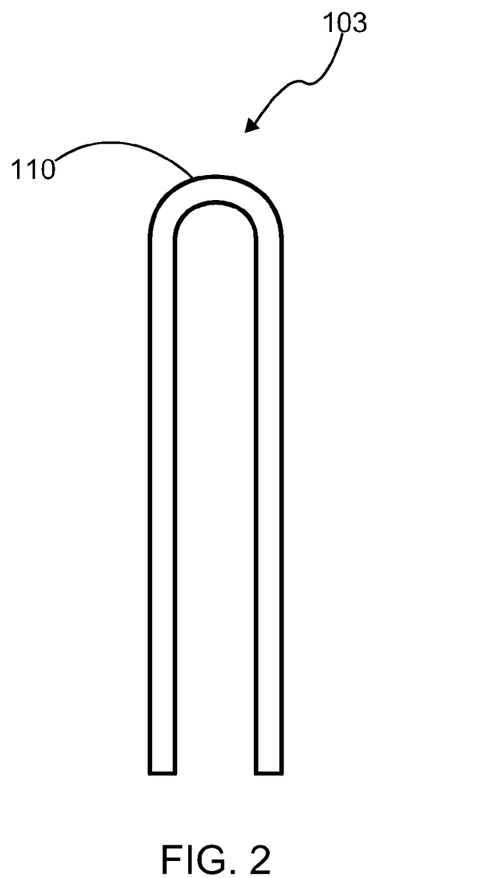
FIG. 2 is a front elevation schematic view depicting the upper portion, or coupling member, of the connector, which is detached from the hanging device shown in FIG. 1.

FIGS. 2-7 depict the process of constructing, or putting together, hanging device 101, as well as various perspectives of one embodiment of the present invention. FIG. 2 is a front elevation schematic view of connector 103, and more specifically, it shows first coupling member 110 of connector 103. As noted above, connector 103 may be constructed of any number of different materials suitable for the purpose of hanging articles of clothing in a plurality of hangers, whether flexible or rigid. Additionally, connector 103 may comprise multiple components or a single component. In the embodiment shown in FIG. 2, connector 103 comprises an upper portion and a lower portion, with first coupling member 110 shown. In this embodiment of connector 103, first coupling member 110 is used to secure hanging device 101 from a car hook.

Figure 3:
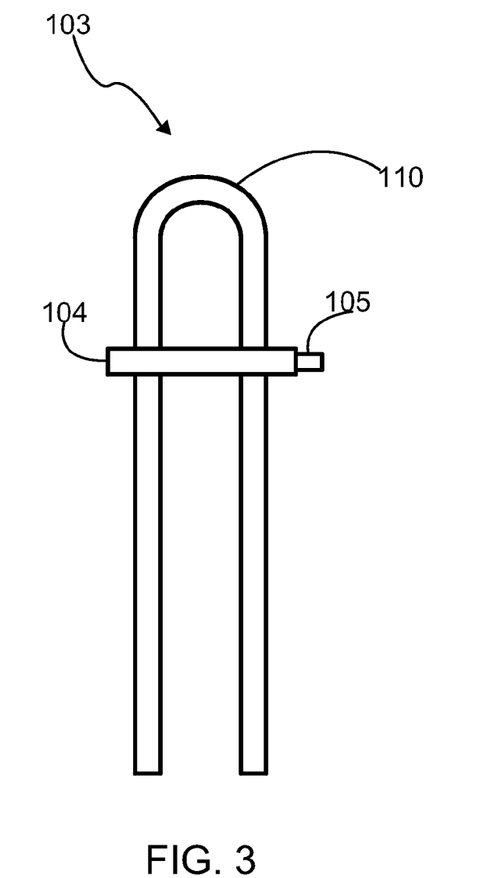
FIG. 3 is a front elevation schematic view depicting the upper portion, or coupling member shown in FIG. 2, with an adjustor for securing a hook or multiple hangers, to the hanging device.
Figure 11:
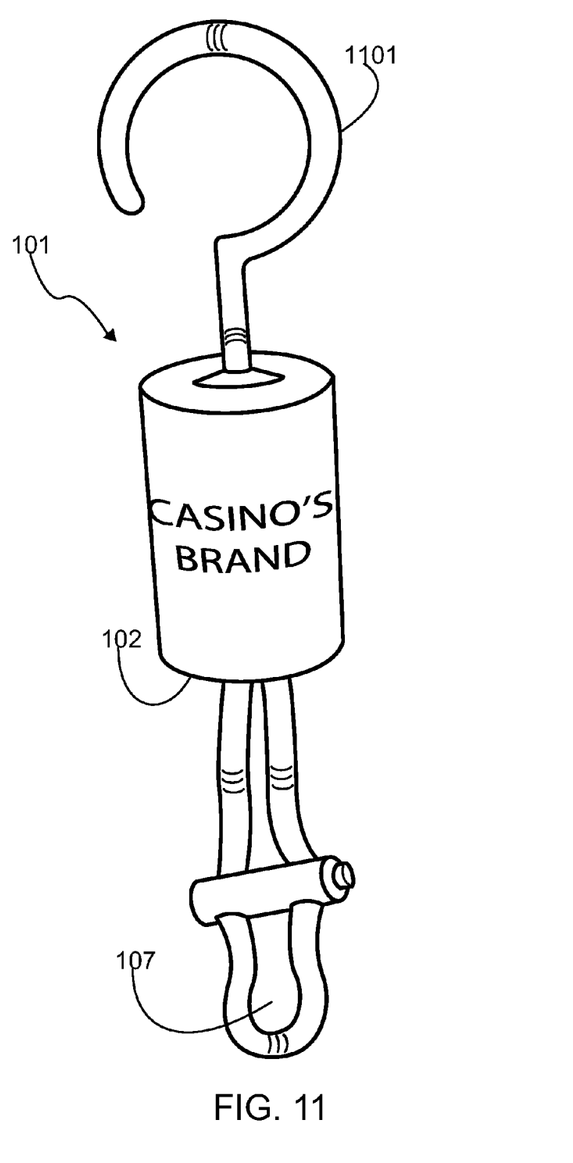
FIG. 11 is a three dimensional schematic view of a hanging device, in accordance with yet another embodiment of the present invention, having the first coupling member comprising a hook and the second coupling member comprising a cord and adjustor.

FIG. 3 is a front elevation schematic view depicting first coupling member 110 of connector 103, which has been adapted with a first adjustor of adjustors 104 for securing hanging device 101 to a car hook. In one embodiment of the present invention, either end of connector 103 may be fed through two openings on adjustors 104 while depressing button 105 on the adjustor. When button 105 is released, tension may be placed upon connector 103 such that adjustors 104 can be secured in place. Although not shown in FIG. 2-FIG. 4, in the illustrated embodiment, second coupling member 111 of connector 103 is identical to first coupling member 110, and can similarly be configured with an adjustor (See FIG. 5). In an alternative embodiment however, first coupling member 110 and second coupling member 111 of connector 103 are different. For example, as shown in FIG. 11, first coupling member 110 of connector 103 may comprise a totally different shape, such as a hook for hanging the device from a vehicle hanger receiving member, or car hook, for hanging clothes inside a vehicle.

Figure 4:
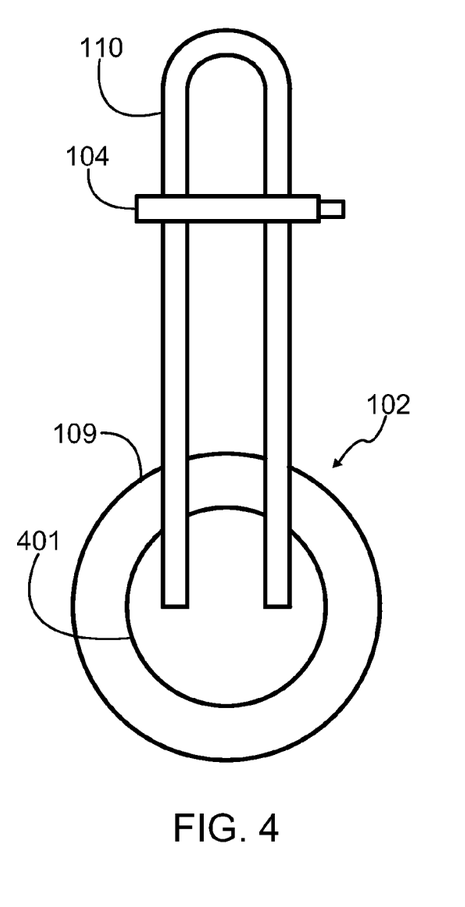
FIG. 4 is a front elevation schematic view of the upper portion of the connector, or first coupling member and adjustor depicted in FIG. 3, showing how the upper portion of the connector or coupling member can be coupled to a back component of a body or advertising member using an adhesive, in accordance with one embodiment of the present invention.

FIG. 4 is a front elevation schematic view of the upper portion of the connector and adjustor depicted in FIG. 3, showing how the upper portion of the connector can be coupled to a back component of an advertising member using an adhesive, in accordance with one embodiment of the present invention. FIG. 4 shows first coupling member 110 of connector 103, and the first of adjustors 104 depicted in FIG. 3, additionally showing back component 109 of advertising member 102.

Connector 103 may be secured to advertising member 102 in many different ways, including the use of an adhesive. Alternatively, first coupling member 110 of connector 103 may be coupled to back component 109 of advertising member 102 with a regular or industrial staple, it may be sown into back component 109, or welded, soldered, or may be securely attached in any other suitable way without departing from the scope of the present invention.

In the embodiment shown in FIG. 4, and by no way limiting the scope of the present invention, first coupling member 110 of connector 103 is coupled or attached to back component 109 via the use of adhesive 401. Said adhesive may consist of, for example, glue, super glue, tape, double sided tape, caulk, or other such adhesives as may be necessary to secure first coupling member 110 to advertising member 102. In another embodiment, first coupling member 110 may also be secured to advertising member 102 by a method of heat application, i.e. utilizing a heat source to mend and solidly connect the first and second coupling members to advertising member 102. Again, any way of securely attaching the coupling members to the advertising member may be implemented without deviating from the scope of the present invention.

Figure 5:
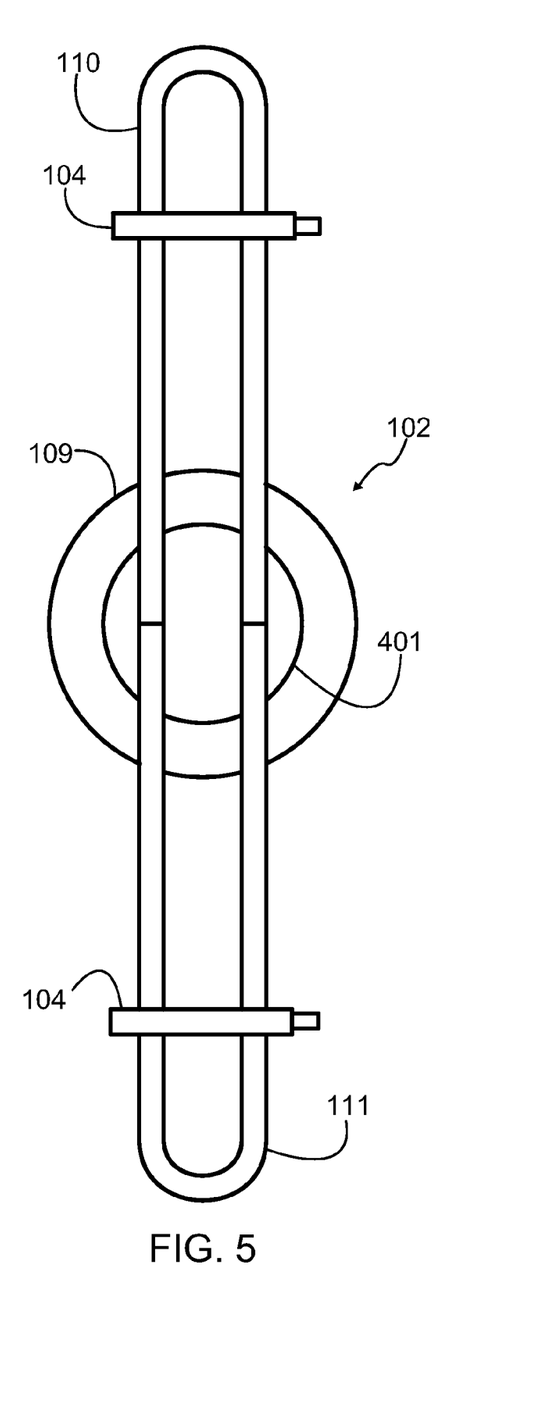
FIG. 5 is a front elevation schematic view of the upper portion of the connector, or coupling member, and adjustor depicted in FIG. 4, in addition to the lower portion of the connector, or second coupling member (also including a second adjustor), coupled to the back component of the advertising member using an adhesive.

FIG. 5 is a front elevation schematic view of the upper portion of the connector and adjustor depicted in FIG. 4, in addition to the lower portion of the connector (also including a second adjustor), coupled to the back component of the advertising member using an adhesive. FIG. 5 shows first coupling member 110 of connector 103, a first adjustor of adjustors 104, advertising member 102, and adhesive 401, with the addition of second coupling member 111 of connector 103, and a second adjustor of adjustors 104.

Second coupling member 111 of connector 103 and the second adjustor of adjustors 104 may be similarly attached to back component 109 of advertising member 102 through any means or methods described in the preceding paragraphs. Furthermore, the second adjustor of adjustors 104, coupled to second coupling member 111 of connector 103, may also be attached by similar means as described above.

Figure 6:
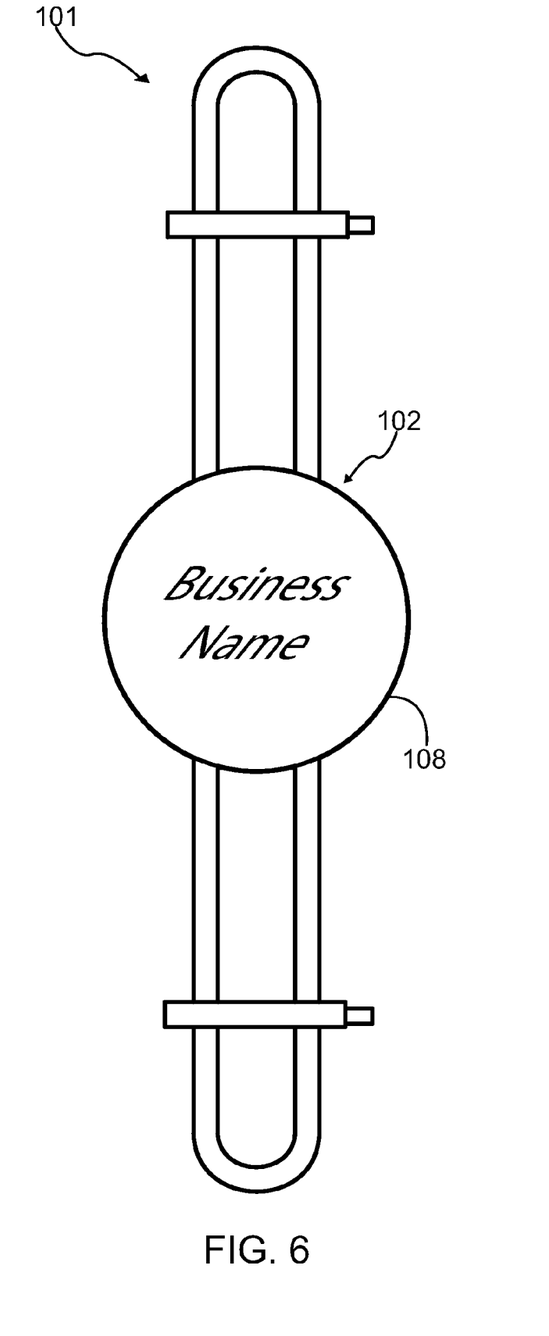
FIG. 6 is a front elevation schematic view of the hanging device depicted in FIG. 5, with the addition of a front component of the advertising member coupled to the first and second coupling members in a manner so that the connector is sandwiched securely between the front component and back component of the advertising member.
Figure 7:
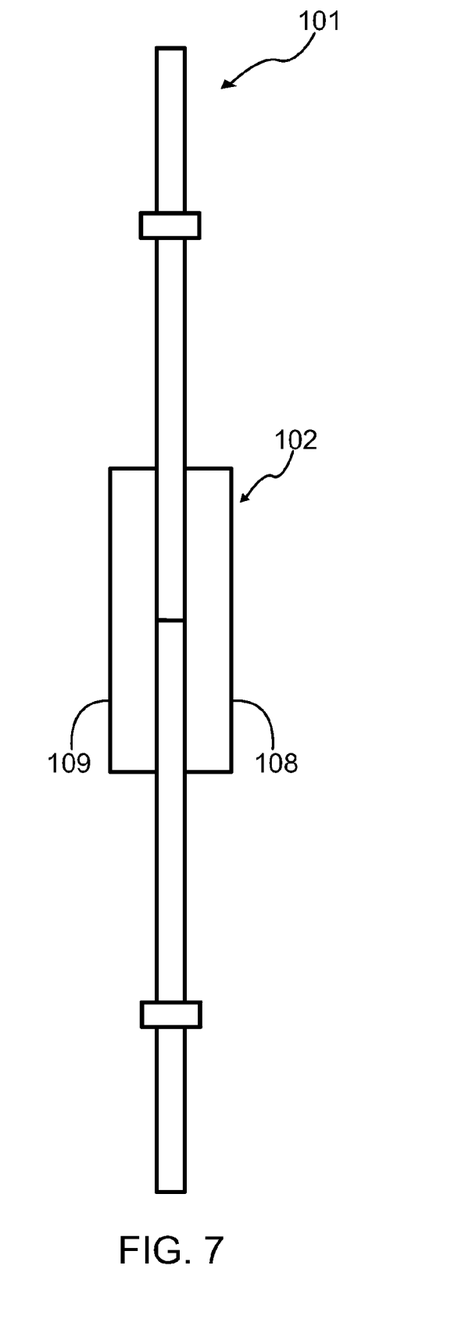
FIG. 7 is a side elevation schematic view of the hanging device depicted in FIG. 6, which shows the first and second coupling members joint together and sandwiched between the two components of the advertising member.

FIG. 6 is a front elevation schematic view of all the parts and components of the hanging device depicted in FIG. 5, which has been put together with the addition of a front component of the advertising member, coupled to the first and second coupling members, in a manner so that the coupling members are sandwiched securely between the front component and back component of the advertising member. FIG. 7 is a side elevation schematic view of the hanging device depicted in FIG. 6, which shows the upper and lower portions of the connector joint together and sandwiched between the two components of the advertising member.

As may be noted from this perspective, advertising member 102 may be comprised of two components. This should not be construed as a limitation. As noted above, and as depicted in the remainder of the specification, the body, or advertising member, may be a single component, or may be comprised of multiple components. For purposes of clarity and continuity of disclosure, however, FIG. 7 depicts only one particular embodiment of hanging device 101.

Specifically, FIG. 6 and FIG. 7 show hanging device 101, with the addition of front component 108 of advertising member 102 coupled to first and second coupling members 110 and 111 in a manner so that connector 103 is sandwiched securely between front component 108 and back component 109 of advertising member 102.

Front component 108 of advertising member 102 may also be attached by any means or methods described in the preceding paragraphs, without limiting or deviating from the scope of the present invention. Once securely constructed, hanging device 101 may be utilized to transport hangers from one location to another. As discussed above, marketing indicia 106 may also be placed on front component 108 or back component 109, or both components of advertising member 102 (unless advertising member 102 is already a marketing object) such that hanging device 101 may be used to convey marketing information to an end user such as a hotel guest, or a guest on a cruise-ship.

Figure 8:
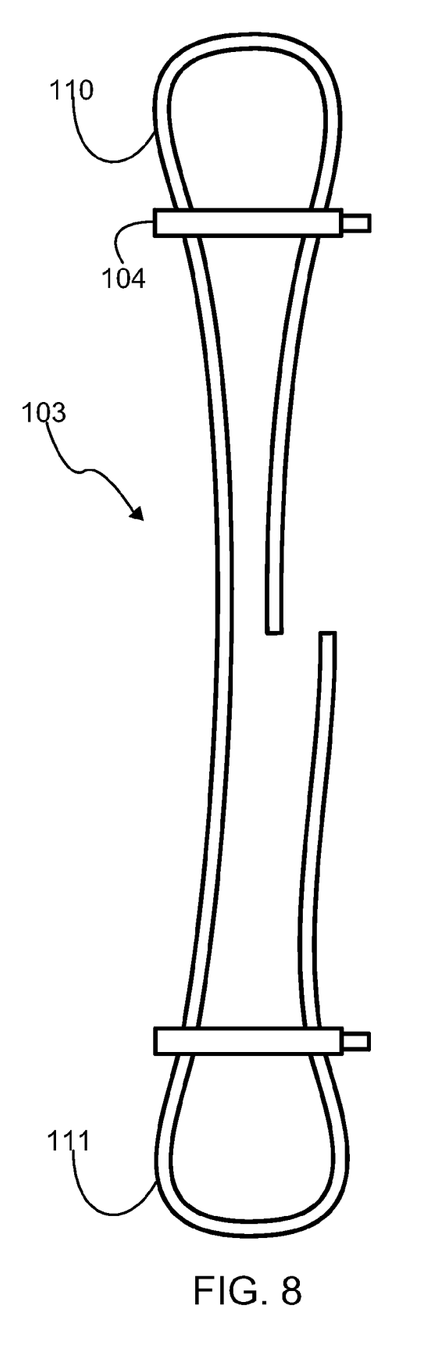
FIG. 8 is a front elevation schematic view of adjustors coupled to a single cord and forming a single loop, which makes up the first and second couplers of the device, in accordance with another embodiment of the present invention. Here, the cord is shown in a disjunctive state, facilitating the coupling of the adjustors.
Figure 9:
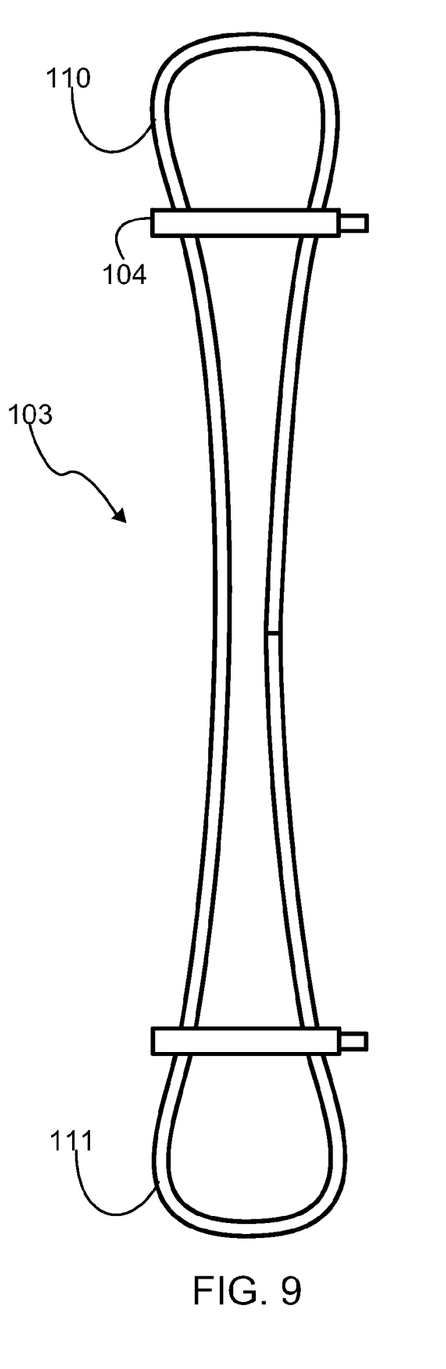
FIG. 9 is a front elevation schematic view of the adjustors and cord in FIG. 8, the cord shown in a merged state, after the adjustors have been coupled to the cord.

FIG. 8 is a front elevation schematic view of adjustors coupled to a single cord, which makes up the first and second coupling members of the device, in accordance with another embodiment of the present invention. Here, the cord is shown in a disjunctive state, facilitating the coupling of the adjustors. FIG. 9 is a front elevation schematic view of the embodiment of connector 103 shown in FIG. 8, depicting adjustors 104 and connector 103 in a merged state. In the embodiment shown in FIG. 8 and FIG. 9, connector 103, or first and second coupling members 110 and 111, comprises a single cord that forms a single loop. In one embodiment, first and second coupling members comprise a single cord made of a synthetic material strong enough to sustain multiple articles of clothing in a plurality of hangers that may be secured by connector 103.

Figure 10:
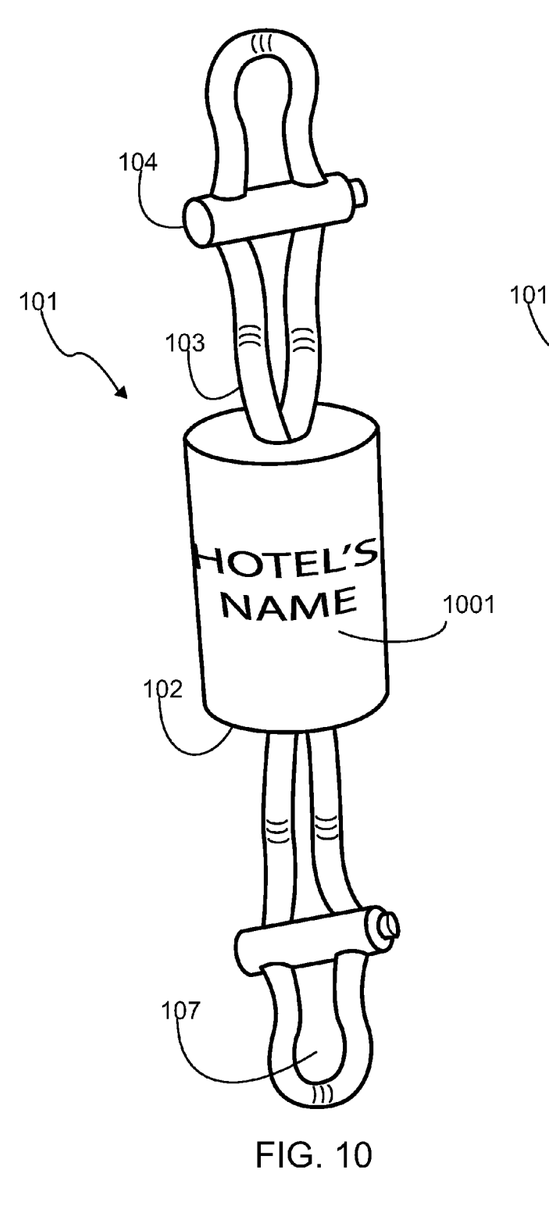
FIG. 10 is a three dimensional schematic view of a hanging device in accordance with another embodiment of the present invention, comprising a single-piece and cylindrically shaped advertising member.

FIG. 10 is a three dimensional schematic view of a hanging device in accordance with another embodiment of the present invention, comprising a single-piece and cylindrically shaped body. FIG. 10 shows another embodiment of hanging device 101, which comprises an alternative embodiment of advertising member 102 constructed as a single component. It may also be noted that this alternative embodiment comprises a flexible connector 103, as well as alternative rounded adjustors 104.

Advertising member 102 may thus be cylindrical in shape with two openings on either end through which connector 103 may pass. Marketing indicia 1001 may also be placed upon the substantially cylindrical advertising member 102 to enable hanging device 101 to convey marketing information of a brand, for example, a hotel's name.

Without deviating from the scope of the present invention, connectors 103 may be attached to advertising member 102 through similar means and or methods described above, including through the use of various adhesives or heat application methods.

FIG. 11 is a three dimensional schematic view of a hanging device, in accordance with yet another embodiment of the present invention, having the upper portion of the connector, or first coupling member, comprising a hook. FIG. 11 shows hanging device 101, in accordance with yet another embodiment of the present invention, wherein the first coupling member comprises hook 1101. Hook 1101 may be constructed of any material suitable for sustaining the pressures of multiple articles of clothing hanging from the device.

For example, and without limiting the scope of the present invention, hook 1101 can be constructed of plastic, metal, or wood and may further be curved by any useful measure. Hook 1101 may also be either attached to advertising member 102 via any of the means or methods described above, including the use of adhesives and or heat application. Hook 1101 may be solidly connected to advertising member 102 during the manufacturing process such that hook 1101 and advertising member 102 are united as one component.

FIG. 12 is a three dimensional close-up schematic view of the lower portion of a connector, or second coupling member, in accordance with an embodiment of the present invention, wherein a second coupling member comprises a cord. An adjustor is coupled to the second coupling member, which is shown retaining a plurality of hooks of several hangers placed in the small loop created by the adjustor, demonstrating how a hanging device in accordance with the present invention can be used to transport clothing from one location to another. FIG. 12 shows second coupling member 111 securely holding multiple hooks 1201 of several hangers placed within loop 107 created by a lower adjustor of adjustors 104.

FIG. 13 is a close-up schematic view of the interior of a vehicle, wherein a typical car hook, or vehicle hanging member, is being used to hang several hangers securely held together with a hanging device, in accordance with one embodiment of the present invention. More specifically, FIG. 13 shows how one of the device's adjustors 104 can securely tighten the upper portion of connector 103 to hang the device from car hook 1301. The lower adjustor 104 is also tightly securing a plurality of hangers 1302, which hold multiple articles of clothing 1303.

Figure 14:
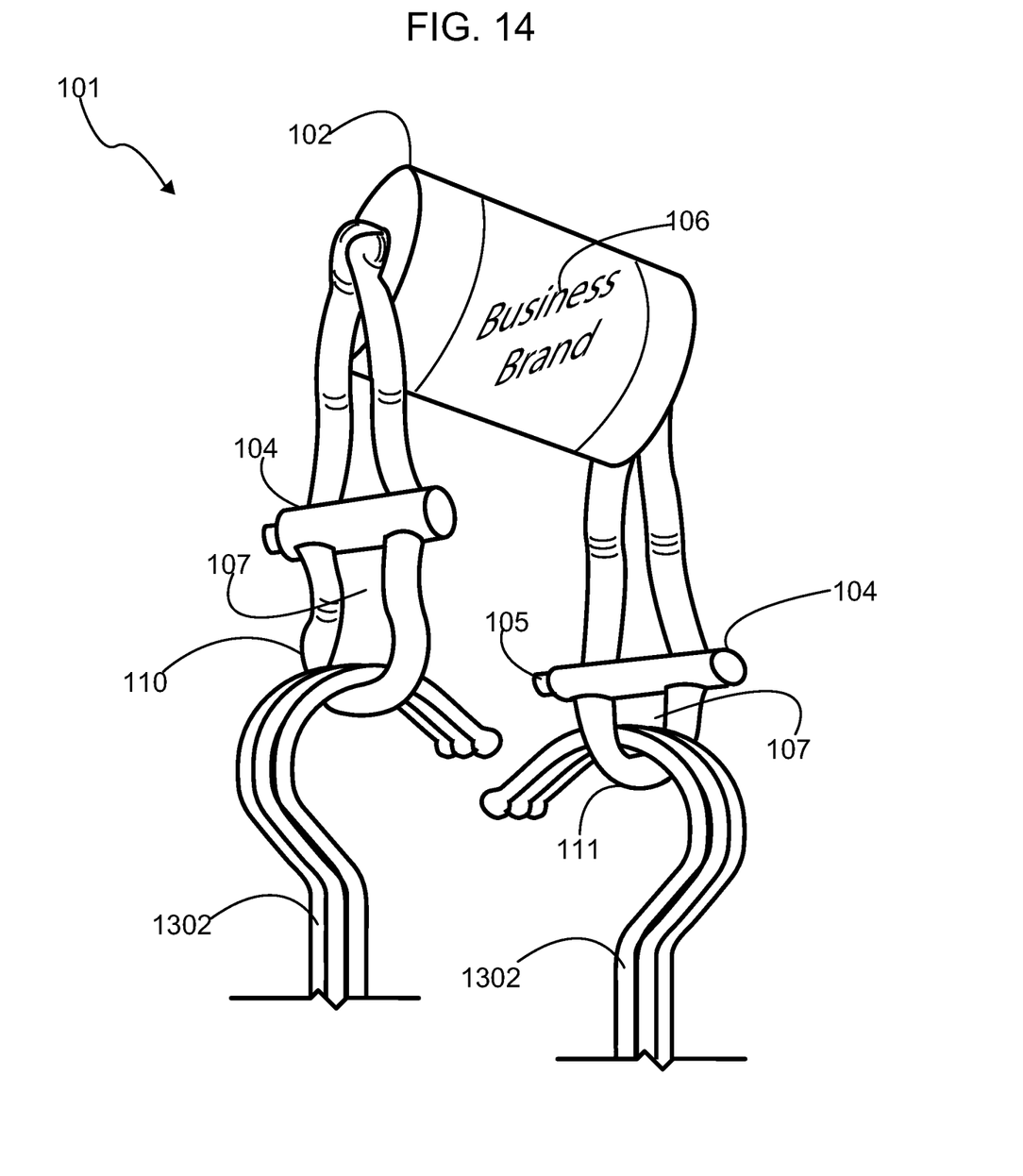
FIG. 14 is a three dimensional close-up schematic view of one embodiment of the present invention, being used to carry or transport a plurality of hangers, wherein a user has coupled multiple hangers to both first and second coupling members, thereby being able to carry the hangers using the advertising member or body as a handle or support.

FIG. 14 is a three dimensional close-up schematic view of one embodiment of the present invention, being used to carry or transport a plurality of hangers, wherein a user has coupled multiple hangers to both first and second coupling members, thereby being able to carry the hangers using the advertising member or body as a handle.

The embodiment shown in FIG. 14 is similar to the embodiment shown in FIG. 10, wherein advertising member 102 comprises a substantially cylindrical shape. First coupling member 110 and second coupling member 111 are coupled securely and held inside a cavity of advertising member 102. Typically, first coupling member 110 can be placed upon a car hook as shown in FIG. 13. However, it may be desirable for a user to grasp hanging device 101 from advertising member 102 and utilize both first and second coupling members 110 and 111 to hang and transport a plurality of hangers 1302 on each of the loops 107 within first and second coupling members 110 and 111.

Figure 15:
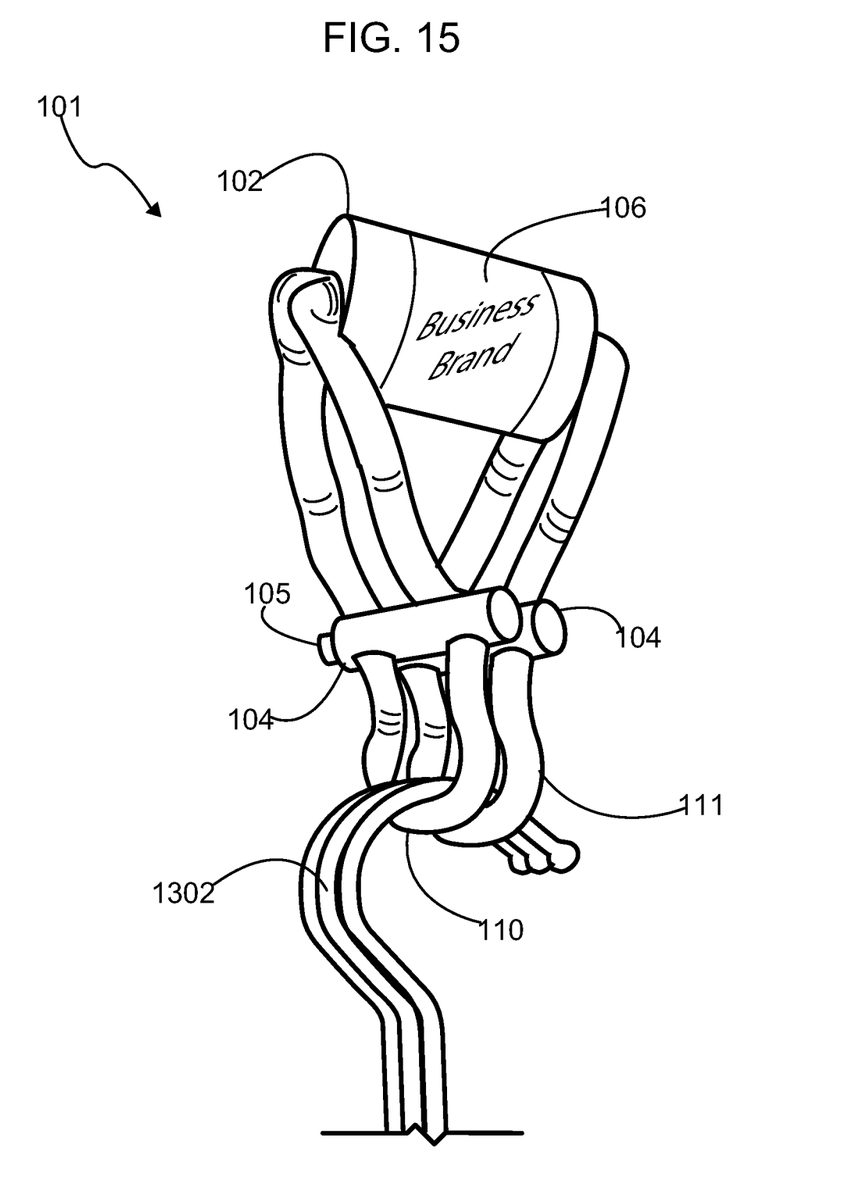
FIG. 15 is a three dimensional close-up schematic view of one embodiment of the present invention, being used to carry or transport a plurality of hangers, wherein a user has coupled multiple hangers to both first and second coupling members by joining the coupling members together, thereby being able to carry the hangers using the advertising member or body as a handle or support.

Finally, FIG. 15 is a three dimensional close-up schematic view of one embodiment of the present invention, being used to carry or transport a plurality of hangers, wherein a user has coupled multiple hangers to both first and second coupling members by joining the coupling members together, thereby being able to carry the hangers using the advertising member or body as a handle or support.

The embodiment shown in FIG. 15 is similar to the embodiment shown in FIG. 14, wherein advertising member 102 comprises a substantially cylindrical shape. A user may take first coupling member 110 and second coupling member 111 and bring them together to form a single support for a plurality of hangers 1302. Typically, first coupling member 110 can be placed upon a car hook as shown in FIG. 13. However, it may be desirable for a user to grasp hanging device 101 from advertising member 102 and utilize both first and second coupling members 110 and 111 to hang and transport a plurality of hangers 1302, for example, when transporting articles of clothing to and from a vehicle. Thus, without deviating from the scope of the present invention, the apparatus for marketing a brand may be utilized in multiple ways depending on the needs of its user.

A hanging device, or apparatus for marketing a brand, has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

DESCRIPTION OF THE REFERENCE SYMBOLS

101: Hanging device
102: Advertising member
103: Connector
104: Adjustors
105: Button
106: Marketing indicia
107: Loop
108: Front component
109: Back component
110: First coupling member
111: Second coupling member
401: Adhesive
1001: Marketing indicia
1101: Hook
1201: Multiple hooks
1301: Car hook
1302: Plurality of hangers
1303: Articles of clothing

What is claimed is:

1. A device for marketing a brand, comprising:
a first coupling member configured to attach to a vehicle hanging member;
a second coupling member coupled to or integral with the first coupling member, wherein the second coupling member is configured to support thereupon one or more clothing hangers;
wherein the first and second coupling members comprise a single closed cord that forms a closed loop;
wherein the first and second coupling members further comprise at least one adjustor coupled to the closed loop for securing the device to the vehicle hanging member and securing the clothing hangers to the device; and
an advertising member coupled between the first and second coupling members, wherein the advertising member comprises:
a front component; and
a back component,
wherein the front and back components of the advertising member are configured for sandwiching the first and second coupling members, the front and back components resembling an object associated with said goods or services; and
indicia for promoting one or more goods or services;
wherein the first and second coupling members are further secured between the front and back components of the advertising member with an adhesive, and the object comprises a casino chip.

* * * * *